(12) United States Patent
Yano et al.

(10) Patent No.: US 8,451,923 B2
(45) Date of Patent: May 28, 2013

(54) MIMO TRANSMISSION MODE SELECTING METHOD AND WIRELESS COMMUNICATION EQUIPMENT

(75) Inventors: Takashi Yano, Tokorozawa (JP); Masashi Naito, Hachioji (JP); Takehiko Kobayashi, Fuchu (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 913 days.

(21) Appl. No.: 12/554,149

(22) Filed: Sep. 4, 2009

(65) Prior Publication Data

US 2010/0080315 A1    Apr. 1, 2010

(30) Foreign Application Priority Data

Sep. 30, 2008   (JP) ................................. 2008-253015

(51) Int. Cl.
*H04L 1/02* (2006.01)
*H04B 7/02* (2006.01)

(52) U.S. Cl.
USPC ........... 375/267; 375/295; 375/299; 370/334; 455/101

(58) Field of Classification Search
USPC ......................................... 375/267, 295, 299
See application file for complete search history.

(56) References Cited

U.S. PATENT DOCUMENTS

| | | | |
|---|---|---|---|
| 2004/0120411 A1* | 6/2004 | Walton et al. | ................. 375/260 |
| 2004/0174840 A1 | 9/2004 | Yano et al. | |
| 2009/0213955 A1 | 8/2009 | Higuchi et al. | |

FOREIGN PATENT DOCUMENTS

| | | |
|---|---|---|
| JP | 2003-143654 A | 5/2003 |
| JP | 2004-266586 A | 9/2004 |
| JP | 2007028569 | 2/2007 |
| JP | 2007306423 | 11/2007 |

OTHER PUBLICATIONS

3GPP TS36211 v8.3.0 "Evolved Universal Terrestrial Radio Access (E-UTRA); Physical Channels and Modulation", "6.3.3 Layer mapping", "spatial multiplexing" and "transmit diversity", May 2008.
JP Office Action in JP App. No. 2008-253015, dated Dec. 25, 2012.

* cited by examiner

*Primary Examiner* — Ted Wang
(74) *Attorney, Agent, or Firm* — Mattingly & Malur, PC

(57) ABSTRACT

In a radio communication apparatus, a MIMO system deciding section of a transmitter unit decides an object MIMO communication system with reference to a CQI value and a measured rate table while an AMC table controlling section selects an object MCS value according to the decided MIMO communication system and CQI value. The AMC table controlling section changes the MCS value step by step according to a transmission count and a result (success/failure) of the communication. If the communication (receiving) is successful or if the transmission count reaches the maximum value, the controlling section updates the mean value of the measured rate table. At this time, based on a value estimated from the combination of the MIMO communication system, the encoding system, and the modulating system that are used currently, the controlling section changes the reference for selecting another combination that are not used currently.

11 Claims, 22 Drawing Sheets

FIG. 4

| CQI | MEAN RATE (STC) | MEAN RATE (SM) |
|---|---|---|
| 0 | $R_{STC}(0)$ | $R_{SM}(0)$ |
| 1 | $R_{STC}(1)$ | $R_{SM}(1)$ |
| 2 | $R_{STC}(2)$ | $R_{SM}(2)$ |
| ⋮ | ⋮ | ⋮ |
| 31 | $R_{STC}(31)$ | $R_{SM}(31)$ |

~13

$$R_{STC}(i) = \frac{\text{TOTAL BITS SENT SUCCESSFULLY IN STC MODE AT CQI}=i}{\text{TOTAL TIME REQUIRED FOR STC MODE TRANSMISSION AT CQI}=i}$$

$$R_{SM}(i) = \frac{\text{TOTAL BITS SENT SUCCESSFULLY IN SM MODE AT CQI}=i}{\text{TOTAL TIME REQUIRED FOR SM MODE TRANSMISSION AT CQI}=i}$$

| CQI | AMC TABLE (STC) | AMC TABLE (SM) |
|---|---|---|
| 0 | $MCS_{STC}(0)$ | $MCS_{SM}(0)$ |
| 1 | $MCS_{STC}(1)$ | $MCS_{SM}(1)$ |
| 2 | $MCS_{STC}(2)$ | $MCS_{SM}(2)$ |
| ⋮ | | |
| 31 | $MCS_{STC}(31)$ | $MCS_{SM}(31)$ |

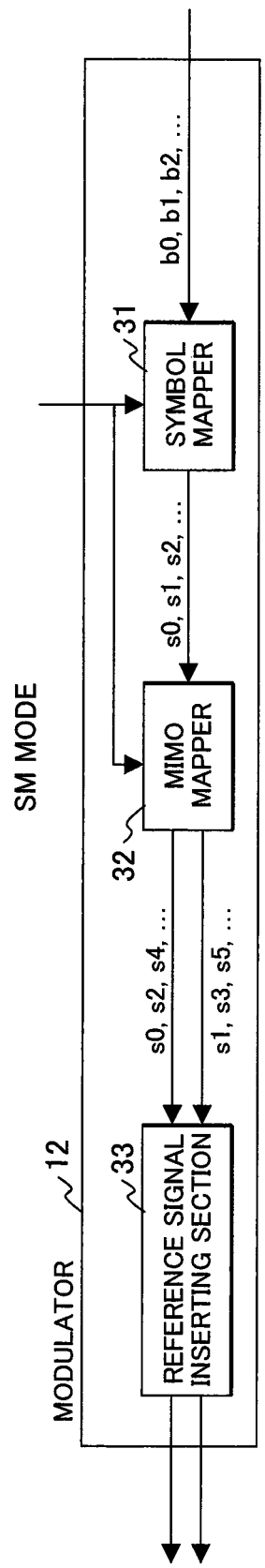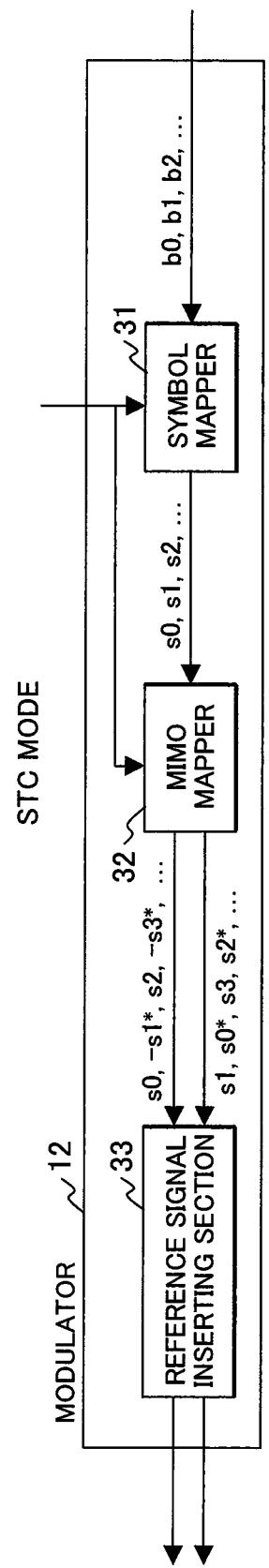

SYMBOL COMPOSITION H-ARQ

BIT LIKELIHOOD COMPOSITION H-ARQ

FIG. 11A

STC MODE $r0 = x0 \cdot h11^* + x1^* \cdot h21 + y0 \cdot h12^* + y1^* \cdot h22$
$r1 = x0 \cdot h21^* - x1^* \cdot h11 + y0 \cdot h22^* - y1^* \cdot h12$
$r2 = x2 \cdot h11^* + x3^* \cdot h21 + y2 \cdot h12^* + y3^* \cdot h22$
$r3 = x2 \cdot h21^* - x3^* \cdot h11 + y2 \cdot h22^* - y3^* \cdot h12$
$r4 = \ldots$

FIG. 11B

SM MODE (MMSE)

$$\begin{pmatrix} r(2n) \\ r(2n+1) \end{pmatrix} = (I + \alpha H^H H)^{-1} H^H \begin{pmatrix} x(n) \\ y(n) \end{pmatrix} \quad H = \begin{pmatrix} h11 & h21 \\ h12 & h22 \end{pmatrix}$$

FIG. 12
(b0,b1,b2,b3)
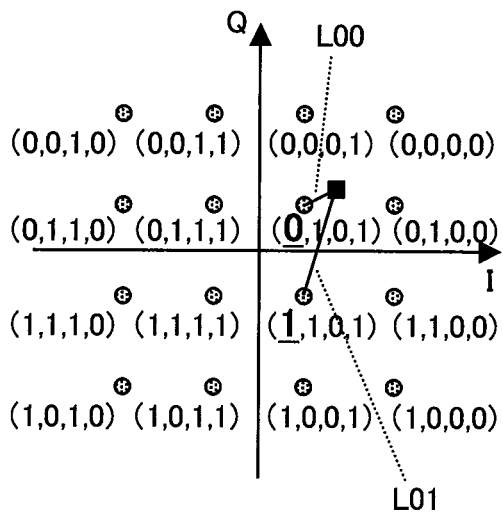
b0 LIKELIHOOD = L00² − L01²
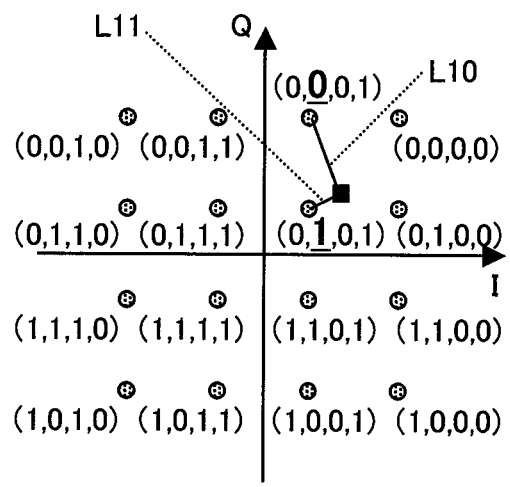
b1 LIKELIHOOD = L10² − L11²
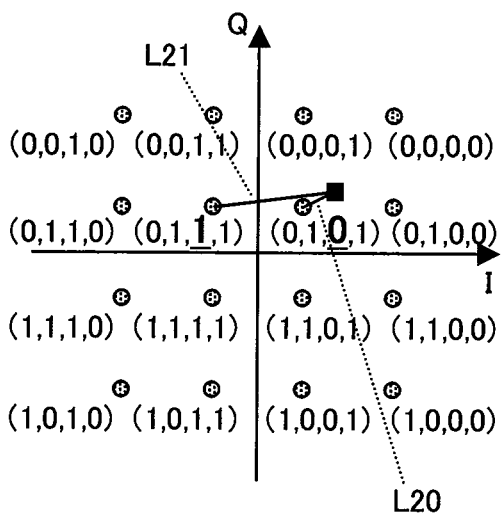
b2 LIKELIHOOD = L20² − L21²
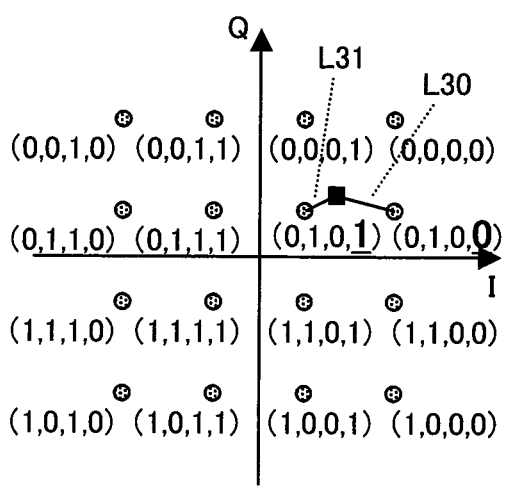
b3 LIKELIHOOD = L30² − L31²

FIG. 18

| MCS | MODULATING SYSTEM | ENCODING SYSTEM |
|---|---|---|
| 0 | MOD(0) | CODE(0) |
| 1 | MOD(1) | CODE(1) |
| 2 | MOD(2) | CODE(2) |
| ⋮ | ⋮ | ⋮ |
| 7 | MOD(7) | CODE(7) |

FIG. 19

| TRANSMISSION COUNT | SUCCESSFUL TIME (ACK) | FAILURE TIME (NACK) |
|---|---|---|
| 1 | $D_S(1)$ | $D_F(1)$ |
| 2 | $D_S(2)$ | $D_F(2)$ |
| 3 | $D_S(3)$ | $D_F(3)$ |
| 4 | $D_S(4)$ | $D_F(4)$ |

FIG. 20A

| TRANSMISSION COUNT | SUCCESSFUL TIME (ACK) | FAILURE TIME (NACK) |
|---|---|---|
| 1 | +0.00001 | +0.001 |
| 2 | 0 | −0.1 |
| 3 | 0 | 0 |
| 4 | 0 | 0 |

FIG. 20B

| TRANSMISSION COUNT | SUCCESSFUL TIME (ACK) | FAILURE TIME (NACK) |
|---|---|---|
| 1 | +0.00001 | 0 |
| 2 | +0.001 | −0.1 |
| 3 | 0 | 0 |
| 4 | 0 | 0 |

FIG. 20C

| TRANSMISSION COUNT | SUCCESSFUL TIME (ACK) | FAILURE TIME (NACK) |
|---|---|---|
| 1 | +0.00001 | 0 |
| 2 | +0.001 | 0 |
| 3 | −0.1 | 0 |
| 4 | 0 | −0.1 |

| CQI | USE FREQUENCY (STC) | USE FREQUENCY (SM) |
|---|---|---|
| 0 | $WT_{STC}(0)$ | $WT_{SM}(0)$ |
| 1 | $WT_{STC}(1)$ | $WT_{SM}(1)$ |
| 2 | $WT_{STC}(2)$ | $WT_{SM}(2)$ |
| ⋮ | ⋮ | ⋮ |
| 31 | $WT_{STC}(31)$ | $WT_{SM}(31)$ |

MIMO TRANSMISSION MODE SELECTING METHOD AND WIRELESS COMMUNICATION EQUIPMENT

CLAIM OF PRIORITY

The present invention claims priority from Japanese Patent Application No. JP 2008-253015 filed on Sep. 30, 2008, the content of which is hereby incorporated by reference into this application.

BACKGROUND OF THE INVENTION

The present invention relates to a radio communication apparatus that selects and uses a proper one of plural transmission systems, as well as a technique for switching among those transmission systems.

There is a well-known wireless, radio communication system usable for mobile communications, etc. in an environment in which the subject radio channel property is frequently changed. The radio communication system uses a technique for making communications by selecting a proper one of MIMO (Multiple Input Multiple Output) communication systems, a proper one of encoding systems, a proper one of modulating systems, etc. respectively. There is also a technique that changes the reference for selecting each of those communication, encoding, and modulating systems in accordance with the actual communication circumstances. The technique is disclosed in, for example, Japanese Patent Application Laid-Open Publication No. 2003-143654. In this Japanese Patent Application Laid-Open Publication No. 2003-143654, the SIR (Signal to Interference power Ratio) is used to change the MCS (Modulation and Coding Scheme) level and control the received SIR reference value used to change the MCS level in accordance with the actual communication circumstances. The present inventor et al. have disclosed an improved technique of the MIMO (Multiple Input Multiple Output) communication system as a related invention in this technical field in Japanese Patent Application Laid-Open Publication No. 2004-266586.

In the document of 3GPP TS 36.211 v8.3.0 "Evolved Universal Terrestrial Radio Access (E-UTRA); Physical Channels and Modulation", "6.3.3 Layer mapping", "spatial multiplexing" and "transmit diversity" are described as modes corresponding to the SM and STC modes.

BRIEF SUMMARY OF THE INVENTION

In case of the technique disclosed in Japanese Patent Application Laid-Open Publication No. 2003-143654, upon changing the MCS level, the reference value is changed in accordance with the receiving performance of each subject mobile machine. However, the reference value should preferably be changed so as to keep a higher communication throughput. And a radio communication apparatus, when it is required to cope with plural MIMO communication systems, comes to be required to change all of the MIMO communication system, the encoding system, and the modulating system to another more proper one respectively.

Under such circumstances, it is an object of the present invention to provide a method for switching among plural MIMO communication systems, plural encoding systems, and plural modulating systems so as to assure a high communication throughput in a radio communication apparatus that uses plural MIMO communication systems. It is another object of the present invention to provide a radio communication apparatus capable of employing the switching method.

In order to achieve the above objects, upon changing the current MIMO communication system to another, the present invention enables an estimated value to be used to select a combination of a MIMO communication system, an encoding system, and a modulating system that are more proper than the current combination, thereby proper systems come to be selected even in an environment in which the statistical characteristics of the communication channel are varied frequently.

Concretely, the present invention provides a transmission system switching method to be employed for a MIMO communication apparatus that makes communications by changing the current combination of a MIMO communication system, an encoding system, and a modulating system to another more proper one and the present invention enables such a combination change to be made with the use of an estimated value obtained from a result of the communication carried out by the combination of the current systems to select another more proper combination of the systems that have not been used, since they have not met with the requirement of the currently set switching reference.

Furthermore, the radio communication apparatus of the present invention, which makes communications by selecting a proper one of plural MIMO communication systems, a proper one of plural encoding systems, and a proper one of plural modulating systems respectively, is configured to include a radio frequency circuit; a demodulating/decoding section that demodulates/decodes a signal received by the radio frequency circuit; an encoding/modulating section that encodes/modulates transmission data; and a processing section that selects such proper MIMO communication, encoding, and modulating systems respectively according to a CQI (Channel Quality Information) value extracted from the signal received by the demodulating/decoding section. This processing section stores a mean rate with respect to each of the plural MIMO communication systems and an MCS value denoting each of the encoding and modulating systems corresponding to each of those MIMO communication systems, selects encoding and modulating systems to transmit object data according to the MIMO communication system decided in accordance with the CQI value, and controls so that the data is transmitted according to the selected encoding and modulating systems. Furthermore, the processing section changes the MCS value corresponding to the currently selected MIMO communication system according to a transmission count and a result (success/failure) of the communication and updates the MCS of each of other not-selected MIMO communication systems with the use of an estimated value.

This is why the present invention can provide a transmission system switching method for selecting a proper one of plural MIMO communication systems, a proper one of plural encoding systems, and a proper one of plural modulating systems respectively to assure a high communication throughput, as well as a radio communication apparatus that can use the switching method.

BRIEF DESCRIPTION OF THE DRAWINGS

FIG. 4 is a measured rate table used in the first embodiment;

FIGS. 7A and 7B are diagrams for describing a configuration and operations of a modulator used in the first embodiment;

FIGS. 11A and 11B are diagrams for describing processings of a MIMO demodulating section used in the first embodiment;

FIG. 12 is a diagram for describing operations of a symbol demapper used in the first embodiment;

FIG. 18 is an MCS value table used in the first embodiment;

FIG. 19 is an MCS value updating amount table in a configuration employed in the first embodiment;

FIGS. 20A-20C are MCS value updating amount tables in a preferable setting example in the first embodiment;

DETAILED DESCRIPTION OF THE INVENTION

Figure 1:
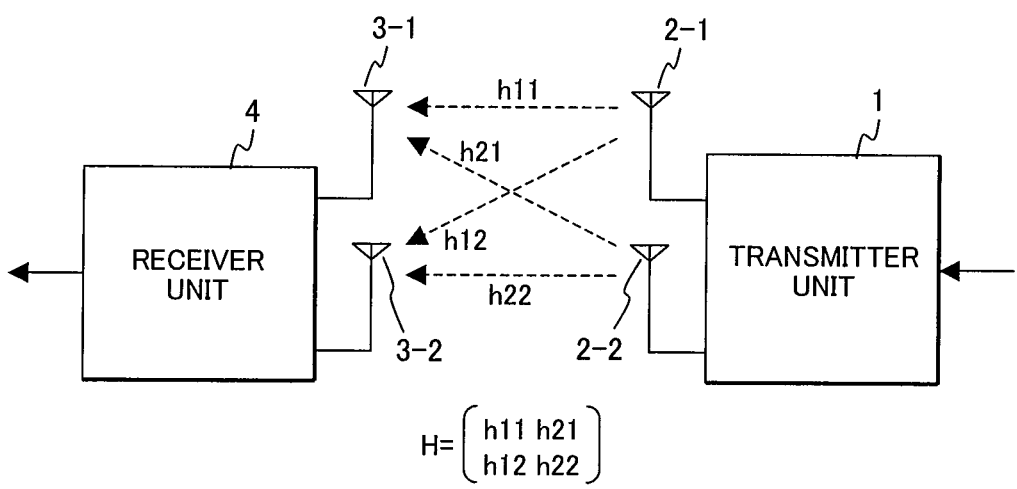
FIG. 1 is a block diagram of a radio communication apparatus for describing a relationship among a transmitter unit, a receiver unit, antennas, and a radio channel.

Hereunder, there will be described first the radio communication apparatus of the present invention. As shown in FIG. 1, the radio communication apparatus is configured so that a transmitter unit 1 sends signals through plural antennas 2-1 and 2-2 and a receiver unit 4 receives those signals through a radio channel and through plural antennas 3-1 and 3-2.

In FIG. 1, only two antennas are used for transmitting and receiving signals. The number of those antennas may be more and may be different between transmitting and receiving. In the channel shown in FIG. 1, it is premised that signals sent out through the antenna 2-1 reach the receiving antennas 3-1 and 3-2 at complex gains h11 and h12, respectively while signals sent out through the antenna 2-2 reach the antennas 3-1 and 3-2 at complex gains h21 and h22 respectively. The communication channel is realized with use of a complex gain matrix H that uses elements h11 to h22.

Although descriptions are to be made only for the MIMO communication system picked as an example of the typical communication system in this specification, the present invention is not limited only to the system, of course. And note that the effective rate (throughput) of the communication channel may be referred to as a "measured rate" and a "mean rate."

First Embodiment

In this first embodiment, the radio communication apparatus selects a proper one of encoding systems and a proper one of modulating systems respectively, so that the apparatus is configured so as to enable the references for selecting those encoding and modulating systems to be changed in accordance with the transmission count and the result (success/failure) of the communication.

Figure 2:
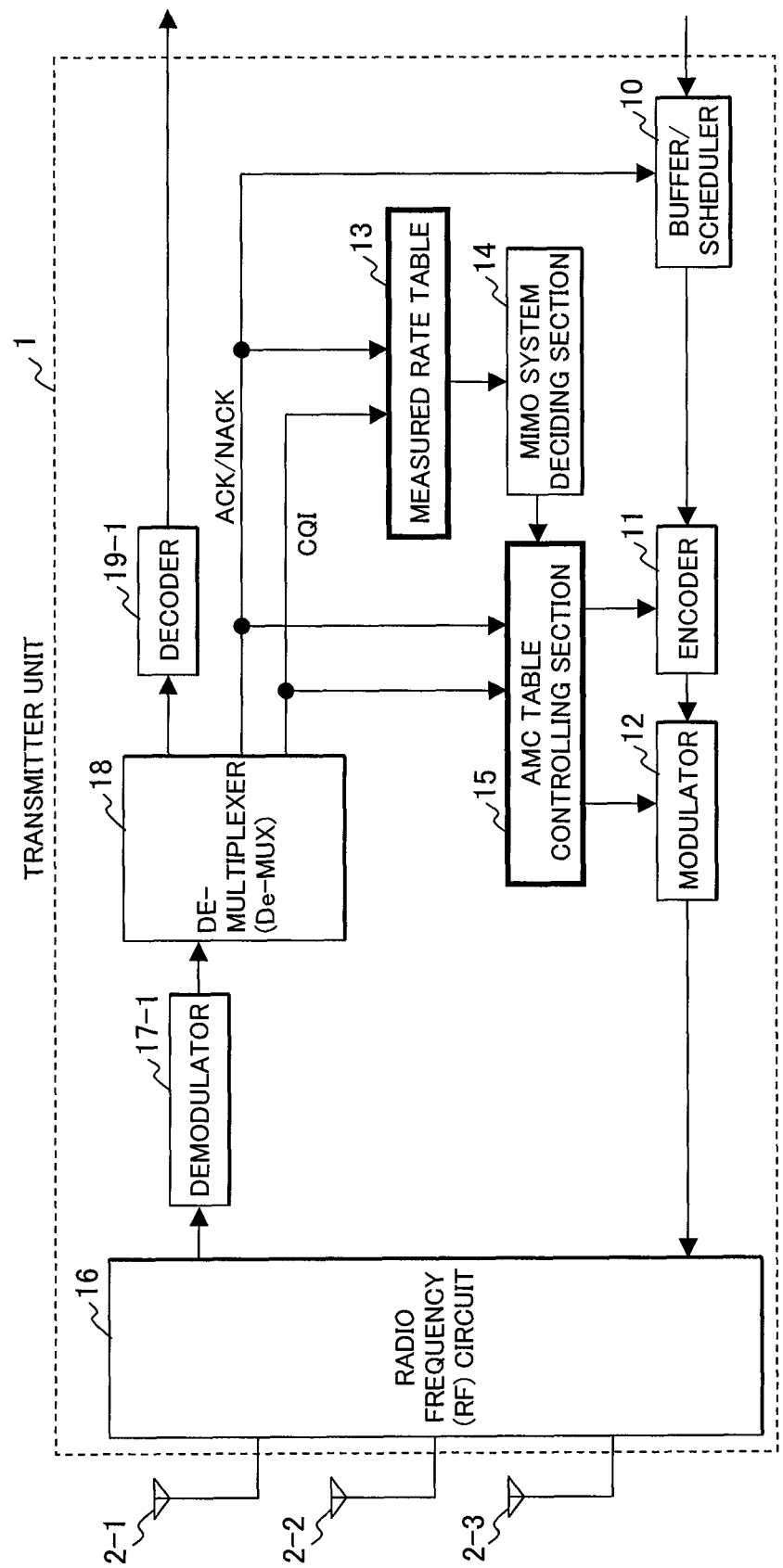
FIG. 2 is a block diagram of the transmitter unit in a configuration employed in a first embodiment.

FIG. 2 is a block diagram of the transmitter unit 1 of the radio communication apparatus in a functional configuration employed in this first embodiment. As described above, the transmitter unit 1 sends signals through the antennas 2-1 to 2-3. In this first embodiment, the unit 1 can select any of plural communication modes (MIMO modes) to send out signals. For example, the MIMO communication system includes an SM (Spatial Multiplexing) mode that enables high speed communications through parallel transmission and an STC (Space-Time Coding) mode that enables stable communications. Hereunder, it is premised that the unit 1 selects one of those SM and STC modes to send out signals. Of course, it is also possible to employ other MIMO modes such as a specific mode transmission mode that maps signals according to a unique vector of the subject channel matrix H, an STBC (Space-Time Block Coding) mode that realizes stable communications with use of four or more antennas, etc.

Upon transmitting data to the receiver unit 4, the transmitter unit 1 refers to the CQI (Channel Quality Information) notified beforehand from the receiver unit 4. The CQI is included in each signal received through any of the antennas 2-1, 2-2, 2-3, etc. And to obtain the CQI, the subject signal is supplied to the demultiplexer (De-MUX) 18 through the radio frequency circuit 16 and the demodulator 17-1, then the signal is demultiplexed therein. The transmitter unit 1 uses the CQI to make high speed communications when the CQI denotes satisfactory communication channel quality and low speed communications when the CQI denotes unsatisfactory communication channel quality. Then, a MIMO system deciding section 14 decides and selects the MIMO mode (SM or STC) that can assure the highest rate communications with reference to a measured rate table 13 according to the currently notified CQI.

After this, according to the decision result of the MIMO system deciding section 14, a AMC (Adaptive Modulation and Coding) table controlling section 15 selects an encoding system and a modulating system appropriately to the current CQI with respect to the selected MIMO mode respectively.

The transmission data is held once in a buffer/scheduler 10 and supplied to the encoder 11 at a proper timing. The encoder 11 encodes signals according to the encoding system decided by the AMC (Adaptive Modulation and Coding) table controlling section 15 and supplies the result to the modulator 12. The modulator 12 then modulates the signals according to the modulating system decided by the AMC (Adaptive Modulation and Coding) table controlling section 15 and the MIMO mode decided above and sends the signals through the antennas 2-1, 2-2, 2-3 and through the radio frequency circuit 16.

The measured rate table 13 holds CQI values, for example, as shown in FIG. 4. In the example shown in FIG. 4, the CQI has 32 values (0 to 31) and the table 13 stores a mean (communication) rate $R_{STC}(n)$ to be expected in the transmission in the STC mode and a mean (communication) rate $R_{SM}(n)$ to be expected in the transmission in the SM mode with respect to each of those CQI values. Those expected values are represented as follows in equation 1.

$R_{STC}(i)$=(Total bits transmitted successfully in the STC mode at $CQI=i$)/(Total time required in the STC mode transmission at $CQI=i$)

$R_{SM}(i)$=(Total bits transmitted successfully in the SM mode at $CQI=i$)/(Total time required in the SM mode transmission at $CQI=i$) [Equation 1]

This means that a given CQI makes it possible to judge which of the STC mode and the SM mode is more effective to obtain a higher communication rate. Consequently, if a mean rate held in the measured rate table 13 is as shown in FIG. 6, the MIMO system deciding section 14 comes to select the SM mode when the CQI value is higher than the threshold value Th on the horizontal axis and the STC mode when the CQI value is lower than the Th value.

Figures 5, 6:
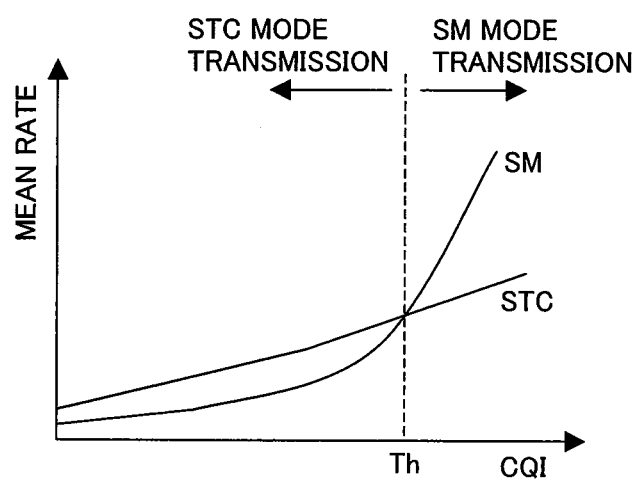
FIG. 5 is an AMC table used in the first embodiment.
FIG. 6 is a graph denoting an example of the measured rate table used in the first embodiment.

Furthermore, the above-described AMC (Adaptive Modulation and Coding) table controlling section 15 holds an AMC table (STC/SM), for example, as shown in FIG. 5. In the example shown in FIG. 5, the AMC (Adaptive Modulation and Coding) table controlling section 15 holds an MCS (Modulation and Coding Scheme) value denoting proper encoding and modulating systems with respect to each of the 32 CQI values (0 to 31), thereby the section 15 comes to be able to select proper encoding and modulating systems in accordance with both a given CQI value and a given MIMO system, that is, the STC or SM mode can be selected in this first embodiment.

In the functional block diagram of the transmitter unit 1 shown in FIG. 2, each of the measured rate table 13, the MIMO system deciding section 14, and the AMC (Adaptive Modulation and Coding) table controlling section 15 consists of an ordinary CPU (Central Processing Unit) and an ordinary memory that are omitted in FIG. 2. Such tables as the AMC table (STC/SM) are stored in a memory. Of course, the judgments, decisions, and selections made according to the contents of those tables can be made with the use of programs loaded into the CPU, which is a processing section.

Figure 14:
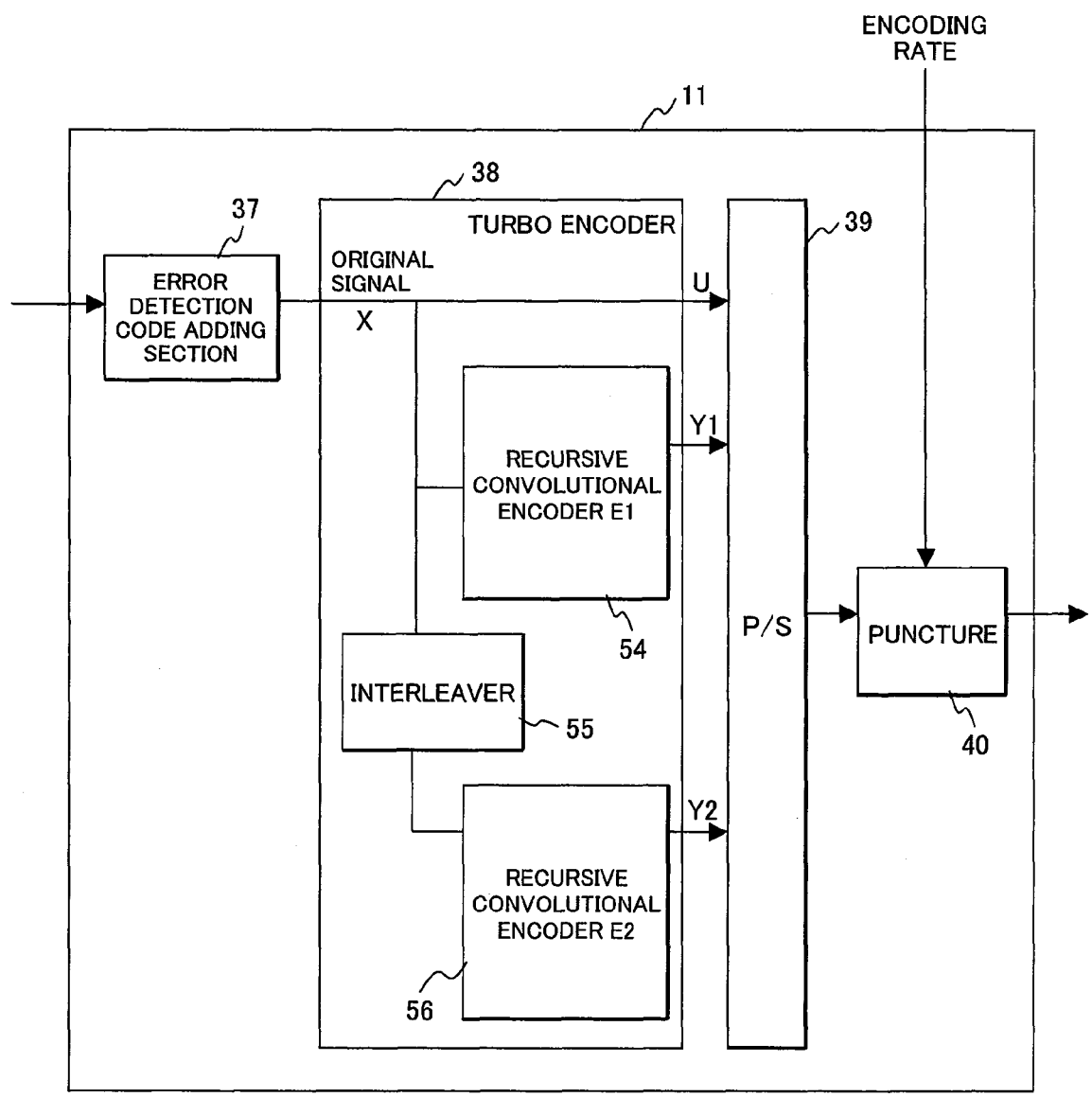
FIG. 14 is a block diagram of an encoder in a configuration employed in the first embodiment.

FIG. 14 shows a configuration of the encoder 11 shown in FIG. 2. The encoder shown in FIG. 14 uses turbo codes. At first, an error detection code is added to each transmission data in an error detection code adding section 37. Then, the data is encoded by two recursive convolutional encoders 54 and 56 and by an interleaver 55 provided in the turbo encoder 38, thereby code words U, Y1, and Y2 are output. Then, a parallel/serial (P/S) converter 39 converts the results to output a series of code words. After this, a puncture section 40 deletes some of the code words according to the encoding system decided by the AMC (Adaptive Modulation and Coding) table controlling section 15 with reference to an internal table, then outputs the encoded result. For example, if the convolutional encoders 54 and 56 are encoders having an encoding rate ½ respectively, each code word comes to consist of 2 redundant bits Y1 and two redundant bits Y2 with respect to a single information bit U. If the code word is not punctured at this time, the encoding rate becomes ⅕, and if a half of each of the Y1 and Y2 is deleted, the encoding rate becomes ⅓. And if Y1 and Y2 are deleted by ¾ respectively, the encoding rate becomes ½. If a code word of which encoding rate is controlled in such a way is output as an encoding result, the interleaving processing should also be carried out at the same time to change the order of bits in the output bit stream.

Figure 8:
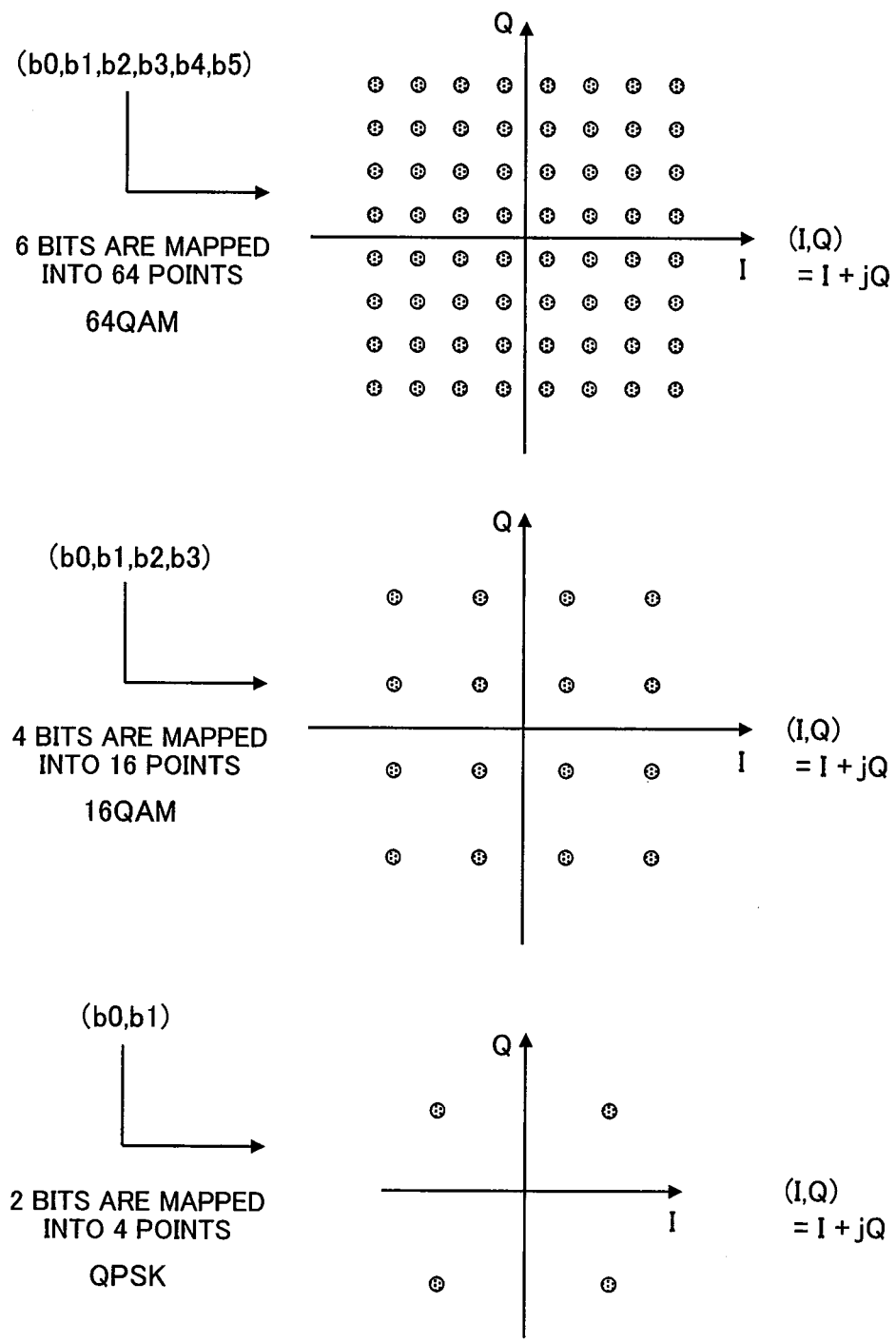
FIG. 8 shows diagrams for describing operations of a symbol mapper used in the first embodiment.

FIGS. 7A and 7B show configurations of the modulator 12 shown in FIG. 2. A bit stream (b0, b1, b2, . . . ) output from the encoder 11 is modulated according to a modulating system decided by a symbol mapper 31 and converted to a complex signal (s0, s1, s2, . . . ) consisting of an I (in-phase number) element and a Q (quadrature number) element. FIG. 8 shows diagrams for describing the operation of the symbol mapper 31. In FIG. 8 are shown three modulation types 64QAM, 16QAM, and QPSK (from up to down). In case of the 64QAM, bits (b0, b1, . . . , b5) are grouped in units of 6 bits and 64 bit combinations are mapped at 64 points on the I and Q complex plane to obtain an output signal I+jQ (modulation symbol). Similarly, in case of the 16QAM, bits (b0, b1, b2, and b3) are grouped in units of 4 bits and mapped at 16 points and in case of the QPSK, bits (b0 and b1) are grouped in units of 2 bits and mapped at four points. Respectively and successively supplied bit streams are also modulated repetitively in each modulation unit (6 bits, 4 bits, or 2 bits as described above).

In FIG. 7A, the modulation symbols output from the symbol mapper 31 are mapped at plural antennas by a MIMO mapper 32. The MIMO mapper 32 makes such signal mapping according to the decided MIMO mode. FIG. 7A shows an example of signal mapping with use of two transmitting antennas in the SM mode. In the example shown in FIG. 7A, the output of modulation symbols is alternated between those two antennas so that each even-numbered modulation symbol is output to the first antenna and each odd-numbered modulation symbol is output to the second antenna. In such parallel outputs, the transmission rate can be doubled.

FIG. 7B shows an example of STC mode signal mapping (Alamouti method). In the STC mode, each modulation symbol is output to both of the two antennas and sent out in different modes. In other words, bits (s0, −s1*, s2, −s3*, . . . ) are output to the first antenna and bits (s1, s0*, s3, s2*, . . . ) are output to the second antenna. Here, the symbol * denotes a complex conjugate. In the STC mode, the same signal is sent out from both of the two antennas so as to assure highly stable communications.

Figure 9:
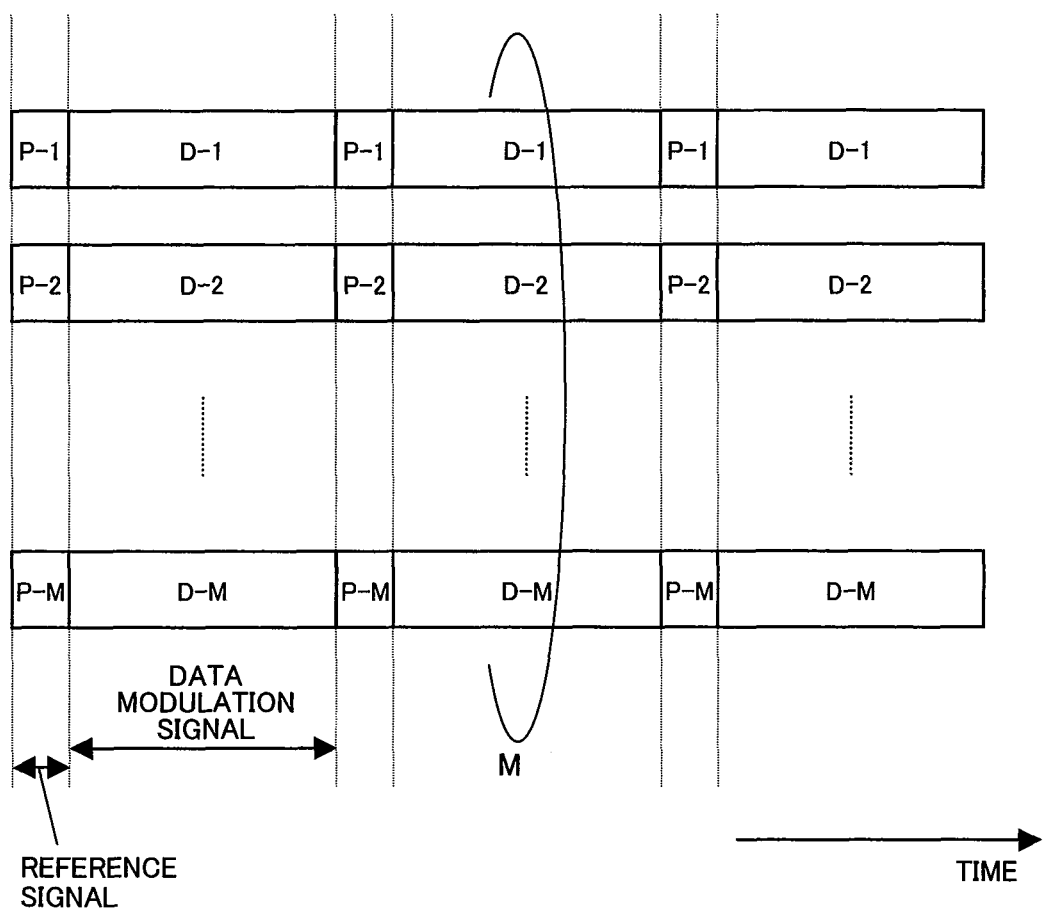
FIG. 9 is a diagram for describing operations of a reference signal inserting section used in the first embodiment.

A data modulation signal, which is a modulation symbol stream mapped at each antenna comes to include a reference signal inserted by a reference signal inserting section 33 and to be referred to by the receiver unit 4. FIG. 9 is a diagram for describing the operation of the reference signal inserting section 33 shown in FIG. 7 (7A and 7B). The data modulation signals D-1 to D-M that are equal to the number of transmitting antennas (M antennas in FIG. 9) output from the MIMO mapper 32 comes to have reference signals P-1 to P-M inserted periodically. The data modulation signals D-1 to D-M are generated from transmission data and varied among transmission data. Thus the signals D-1 to D-M are unknown at the receiver. The reference signals P-1 to P-M are decided by the subject communication system, so that they are already known at the receiver. Therefore, those signals P-1 to P-M are used as reference signals and the channel estimating section at the receiver as is to be described later uses those reference signals to estimate the subject channel.

Figure 3:
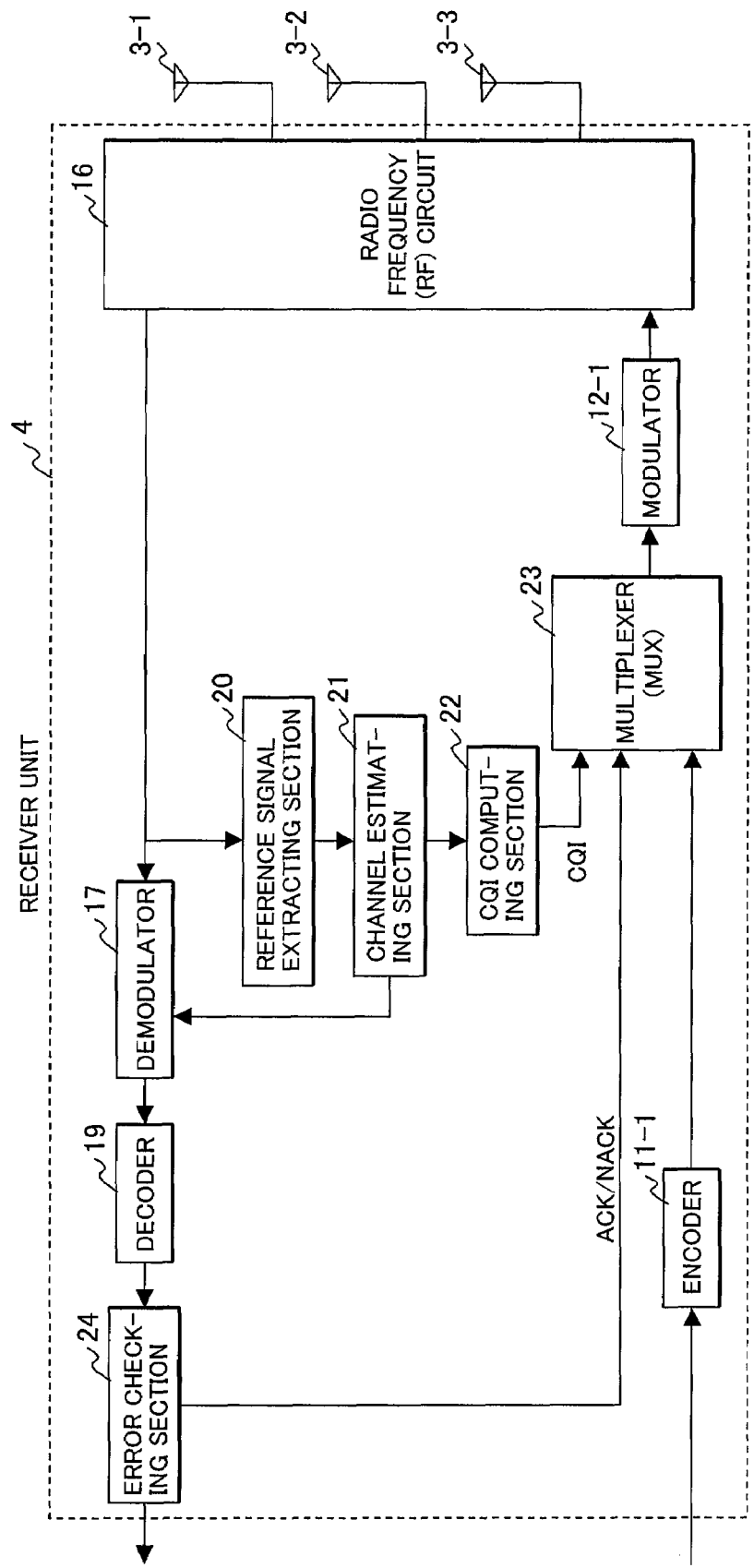
FIG. 3 is a block diagram of the receiver unit in a configuration employed in the first embodiment.

FIG. 3 shows a block diagram of the receiver unit 4 provided in the radio communication apparatus, in a configuration employed in this first embodiment. Signals received by plural antennas 3-1 to 3-3 are supplied to a reference signal extracting section 20 and to a demodulator 17 through the radio frequency circuit 16 respectively. The reference signal extracting section 20 separates and extracts the reference signals (P-1 to P-M) inserted by the transmitter unit 1 described above. The separated and extracted reference signals (P-1 to P-M) are then supplied to a channel estimating section 21 and the characteristics of the channel are checked therein. The characteristics of the channel to be checked here are the above-described complex gain matrix H, noise level, etc. required between the transmitter antennas 2-1 to 2-3 and the receiver antennas 3-1 to 3-3.

A CQI computing section 22 figures out a CQI (Channel Quality Information) by using the obtained channel characteristics. The CQI is a control signal for denoting the subject channel quality. The CQI may be simple control information based on a mean SNR (Signal to Noise Ratio) of the received reference signals (P-1 to P-M) or it may be control information based on an estimated value of the channel capacity denoting a degree of the possible communication rate.

Here, needless to say, each of the reference signal extracting section 20, the channel estimating section 21, and the CQI computing section 22 can be realized with a processing section (CPU) and a memory (for storing data and programs), which are omitted in FIG. 3 just like others in each of the receiver unit 4 and transmitter unit 1.

In this first embodiment, the obtained CQI is notified to the transmitter unit 1 through a multiplexer 23, a modulator 12-1, the radio frequency circuit 16, and each of the antennas 3-1 to 3-3 prior to the communication or periodically. As described above, in the transmitter unit 1, the MIMO mode, the encoding system, and the modulating system decided according to this CQI are used to send signals to the receiver unit 4.

Signals output to the receiver unit 4 from the transmitter unit 1 are supplied to the reference signal extracting section 20 and the demodulator 17 respectively through the antennas 3-1 to 3-3 and through the radio frequency circuit 16. The channel estimating section 21 checks the latest channel characteristics again with use of the reference signals (P-1 to P-M) extracted by the reference signal extracting section 20 and supplies the characteristics to the demodulator 17. The demodulator 17 then demodulates the received signals according to the obtained latest channel characteristics and supplies the demodulated signals to a decoder 19. The decoder 19 then makes error correction and decoding for the received signals so as to correct the error if it is detected in each demodulated signal. The received signals decoded by the decoder 19 are then supplied to an error checking section 24 so as to be checked for error existence. After this, each of those received signals is sent back to the transmitter unit 1 as a control signal, which is an ACK denoting receiving success or a NACK denoting receiving failure through the multiplexer 23, the modulator 12-1, the radio frequency circuit 16, and each of the antennas 3-1 to 3-3.

As described above, upon receiving an ACK (success) as a result of the sent-back control signal, the transmitter unit 1 completes the current data transmission and begins the next data transmission. Upon receiving a NACK (failure) as a result of the sent-back control signal, the transmitter unit 1 retransmits the current data. In case of this retransmission, the same data may be retransmitted or the redundant bits may be sent additionally. The redundant bits are those deleted by the puncture section 40 of the encoder 11 shown in FIG. 14 in the transmitter unit 1.

Figure 10A:
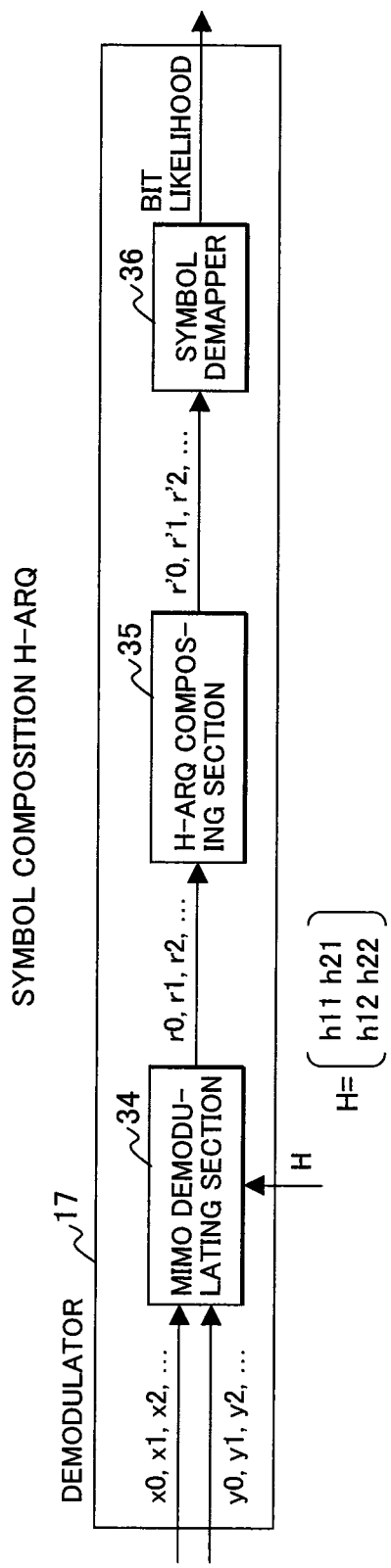
FIGS. 10A and 10B are diagrams for describing a configuration and operations of a demodulator used in the first embodiment.
Figure 10B:
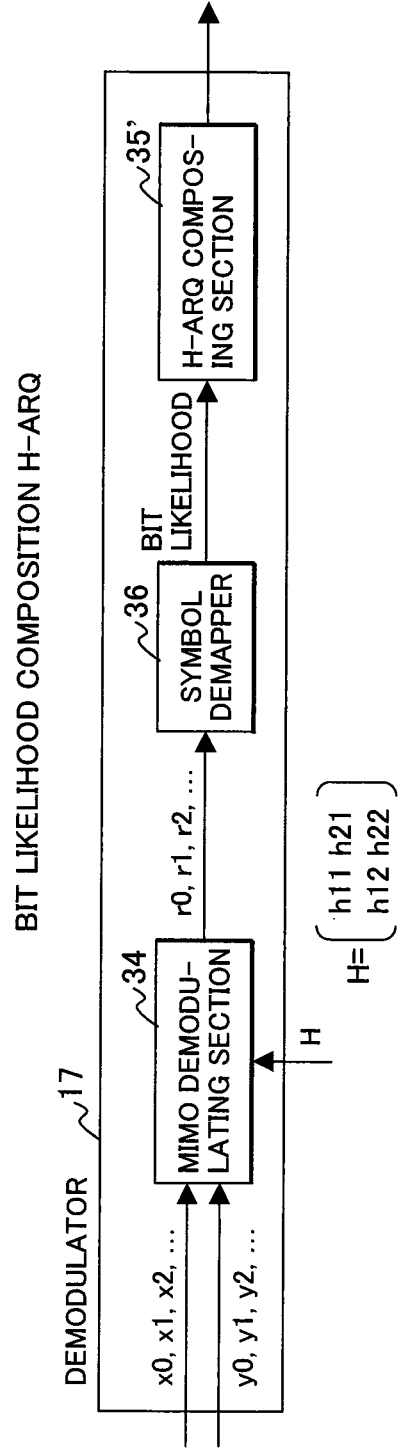

FIGS. 10A and 10B show configurations of the demodulator 17 of the receiver unit 4 in this first embodiment. In FIGS. 10A and 10B, two antennas are used. The signals (x0, x1, x2, ...) and (y0, y1, y2, ...) received through those two antennas are supplied to a MIMO demodulating section 34. The MIMO demodulating section 34 then carries out MIMO demodulation as shown in FIGS. 11A and 11B for those received signals with the use of the complex gain matrix H obtained by the channel estimating section 21.

For example, if the STC mode is set as the MIMO mode, the demodulation can be made according to the result of the computing as shown in FIG. 11A. If the SM mode is set as the MIMO mode, the demodulation can be made according to the result of computing as shown in FIG. 11B. In FIG. 11B, the "α" represents an integer decided by the SNR (Signal to Noise Ratio) of the subject received signal. Although FIG. 11B shows MIMO demodulation based on the MMSE (Minimum Mean Square Error) rule, the subject modulating system may be another corresponding to the SM mode, for example, Zero Forcing modulation or the like. The modulating system may also be MLD (Maximum Likelihood Detection) that requires batch processings to be carried out in cooperation with a symbol demapper 36 to be described later.

FIG. 10A shows demodulating processings for the same data that are retransmitted. In FIG. 10A, the MIMO demodulation results (r0, r1, r2, ...) are supplied to an H-ARQ (Hybrid ARQ) combining section 35. The section 35 then combines the preceding MIMO demodulation results with the current demodulation result at each retransmission time and outputs the result of the combination (r0', r1', r2', ...). In this case, because the same data are received in such a way, received signals are added up, thereby the quality of receiving is improved. The H-ARQ combination results (r0', r1', r2', ...) are supplied to the symbol demapper 36, then demultiplexed into bit demodulation results according to the modulating system, thereby bit likelihood information is output.

FIG. 12 is an explanatory diagram for describing the operation of the symbol demapper 36. In FIG. 12, a 16QAM case is shown. This also goes for any other modulating systems. Upon obtaining a 4-bit (b0, b1, b2, and b3) demodulation result, candidate points for b0=0 and b0=1 are selected from modulated signal points corresponding to b0=0 and b0=1 respectively, which are the closest to the received signal point (received symbol) denoted by the square in FIG. 12, then the distances between each selected candidate signal point and received signal point are measured and the results are assumed as L00 and L01. According to this result, $L00^2-L01^2$ is output as the b0 received signal likelihood. This processing is also carried out similarly for each of b1 to b3.

The demodulator 17 can also be configured as shown in FIG. 10B. The configuration shown in FIG. 10B that is applied to the case in which the completely same data is retransmitted can also be applied to the case in which redundant bits are additionally transmitted as described above. In case of the configuration shown in FIG. 10B, the MIMO demodulation results (r0, r1, r2, ...) are supplied to the symbol demapper 36 and converted to bit likelihood information. The bit likelihood information is then supplied to an H-ARQ combining section 35' so as to combine the retransmitted signals. If the same data is retransmitted, bit likelihood information is added to the likelihood of each bit at each retransmission time so as to combine the data just like in the case described in FIG. 10A. If redundant bits are added in such a way, the likelihood of the added redundant bits is combined with the bit likelihood, which is the previous demodulation result, thereby the reliability of the demodulation result is further improved.

Figure 13:
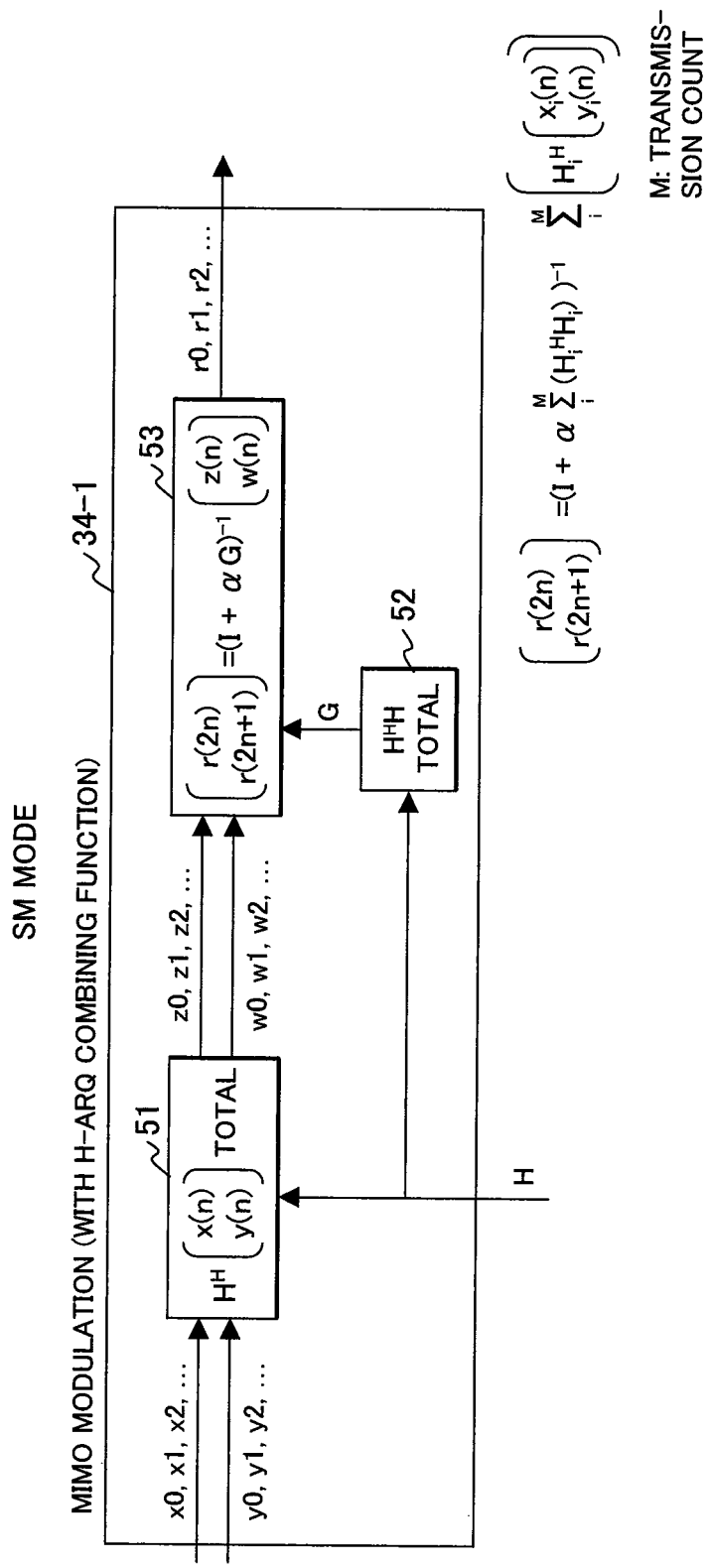
FIG. 13 is a diagram for describing another configuration and processings of the MIMO demodulating section used in the first embodiment.

If MMSE demodulation is to be carried out as the demodulation shown in FIG. 10A, the processings of the MIMO demodulator 34 and the H-ARQ combining section 35 should be carried out together, thereby the demodulation characteristics can be improved more than when the processings of the MIMO demodulator 34 and the H-ARQ combining section 35 are carried out separately. In the example shown in FIG. 13, the H-ARQ combination is carried out in the stage of the channel matrix H prior to the MIMO demodulation. In other words, the received signal to be retransmitted is combined with the channel matrix H in each of accumulators 51 and 52 and an MMSE processing is carried out for the result in a processing section 53. This configuration is especially effective to improve the characteristics when the channel matrix H is changed at the retransmission time.

Figure 15:
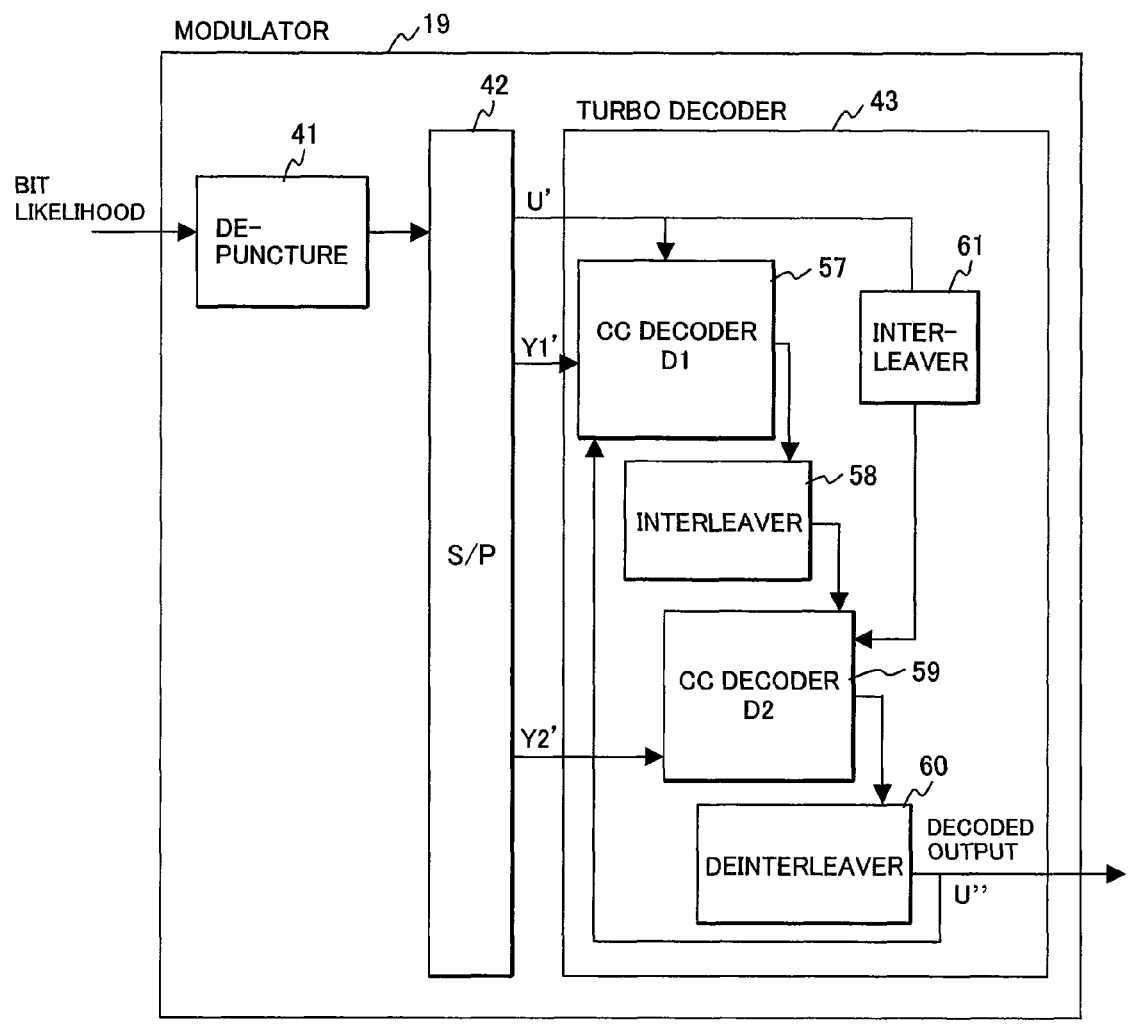
FIG. 15 is a block diagram of a decoder in a configuration employed in the first embodiment.

FIG. 15 shows a configuration of the decoder 19 used in the receiver unit 4 in this first embodiment. A series of signals received by the demodulator 17 is added to some of the code words deleted at the receiver in a depuncture section 41, then the result is output. At this time, these bits are not transmitted actually, so that the bit likelihood is assumed to be 0. After the depuncturing, the signals are separated into U', Y1', and Y2' in a serial/parallel (S/P) converter 42 and decoded by a turbo decoder 43, thereby the decoded signal U" is output. At this time, receiving errors are corrected repetitively in the decoding process with repetitive use of the CC (Convolutional Code) decoders 57 and 59, the interleavers 58 and 61, and the deinterleaver 60. If any interleaving is carried out here by the transmitter puncturing section 40, the puncturing section 40 described above is expected to carry out deinterleaving to restore the original order of the bits in the bit stream.

Next, using FIGS. 16A and 16B, there will be described in detail how to decide a proper communication system (MIMO, etc.), a proper encoding system, and a proper modulating system respectively, as well as how to update the measured rate table and the AMC table in the transmitter unit 1 in this first embodiment. These processings are carried out with use of the measured rate table 13, the MIMO system deciding section 14, and the AMC (Adaptive Modulation and Coding) table controlling section 15 included in the transmitter unit 1 shown in FIG. 2. Needless to say, the flowchart shown in FIG. 16A can also be executed with the use of programs loaded into a CPU (not shown), which is equivalent to the processing section in the transmitter unit 1 described above.

Figure 16A:
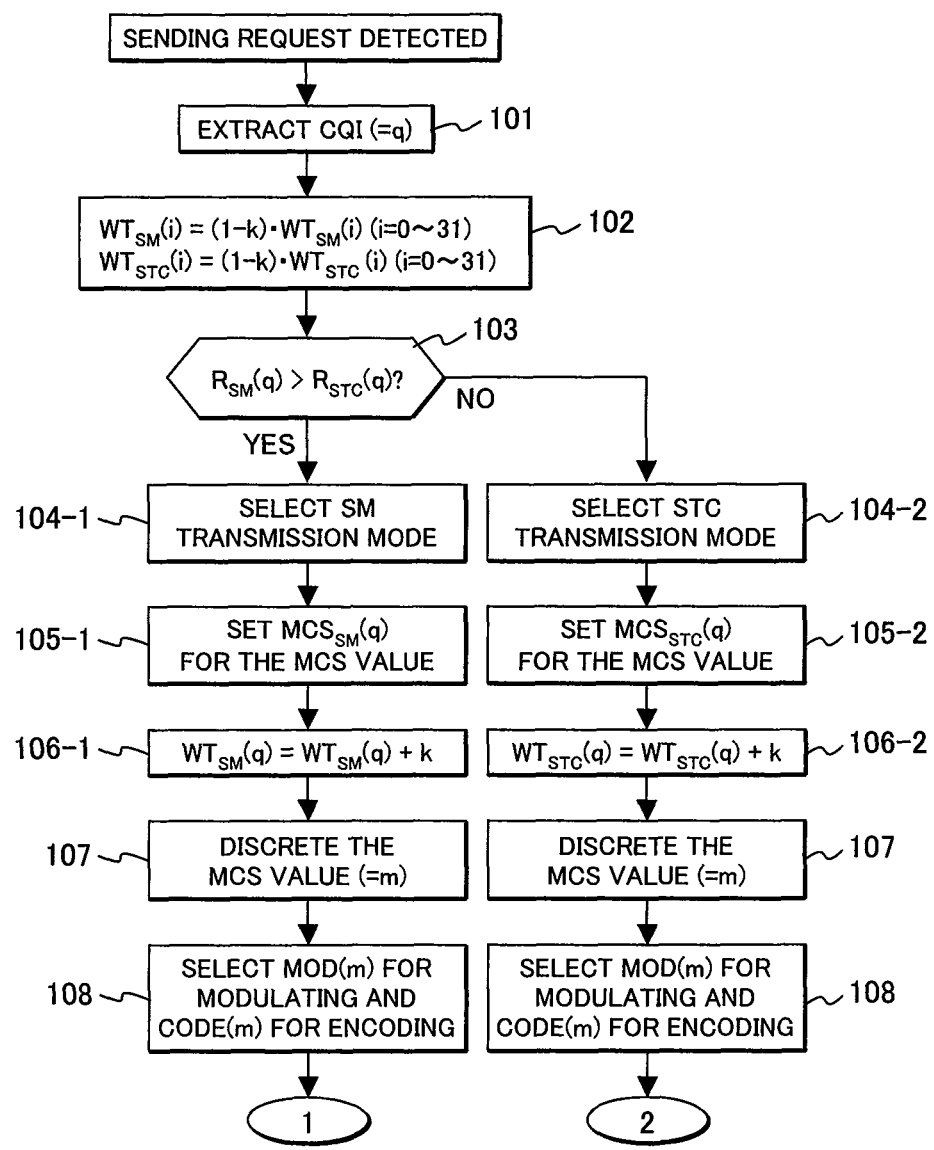
FIG. 16A is a flowchart of the discrete processings for the MCS value in the first embodiment.

In FIG. 16A, the processing section, upon detecting a transmission request, extracts the latest CQI in step 101. If the extracted CQI value is "q", the processing section refers to the mean rate held in the measured rate table 13 in step 103 to decide a MIMO mode that can assure a higher throughput (mean rate/effective rate). Then, according to the result of the decision, the MIMO system deciding section 14 decides a proper MIMO mode in steps 104-1 and 104-2. The AMC (Adaptive Modulation and Coding) table controlling section 15 then refers to the AMC table shown as an example in FIG. 5 in the decided MIMO mode to decide the MCS value in steps 105-1 and 105-2. In this embodiment, as described above, the STC mode and the SM mode can be selected as the MIMO mode at this time. The mode is not limited only to those, however; another communication mode can also be selected at this time, of course.

Figure 17:
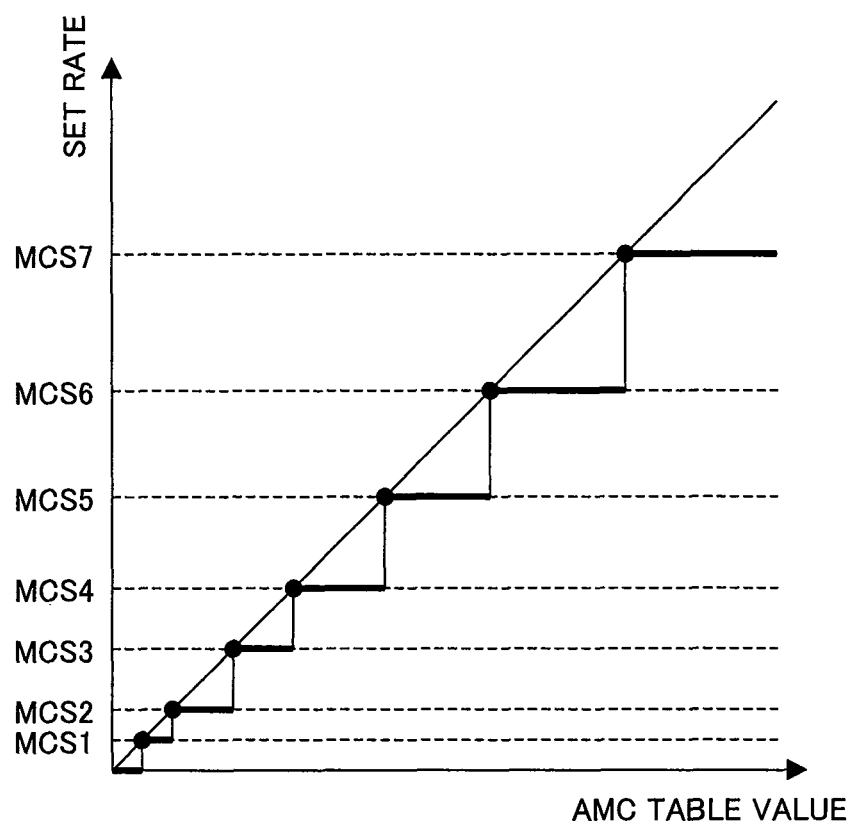
FIG. 17 is a graph for describing an example of the discrete processings for the MCS value in the first embodiment.

And because the AMC table shown in FIG. 5 holds consecutive values, the processing section (not shown) converts each subject value to a discrete MCS value in step 107 in FIG. 16A so as to be used actually by the transmitter unit 1 and by the receiver unit 4. In step 107, the processing section converts the subject value to the maximum discrete MCS value with use of a stepped function as shown in FIG. 17 within a range in which the discrete MCS value never exceeds any of the MCS values held in the AMC table. In FIG. 17, the horizontal axis denotes the AMC table value and the vertical axis denotes the MCS value (set rate).

If the discrete MCS value is "m" at this time, the processing section refers to the MCS table as shown in FIG. 18 in step 108 to select an encoding system (CODE(m)) and a modulating system (MOD(m)). The MCS table is stored in a memory (not shown) and the processing section that functions as an AMC table controlling section 15 reads the encoding and modulating systems corresponding to the subject MCS value from the memory and inputs them to the encoder 11 and the modulator 12 as control signals.

Figure 16B:
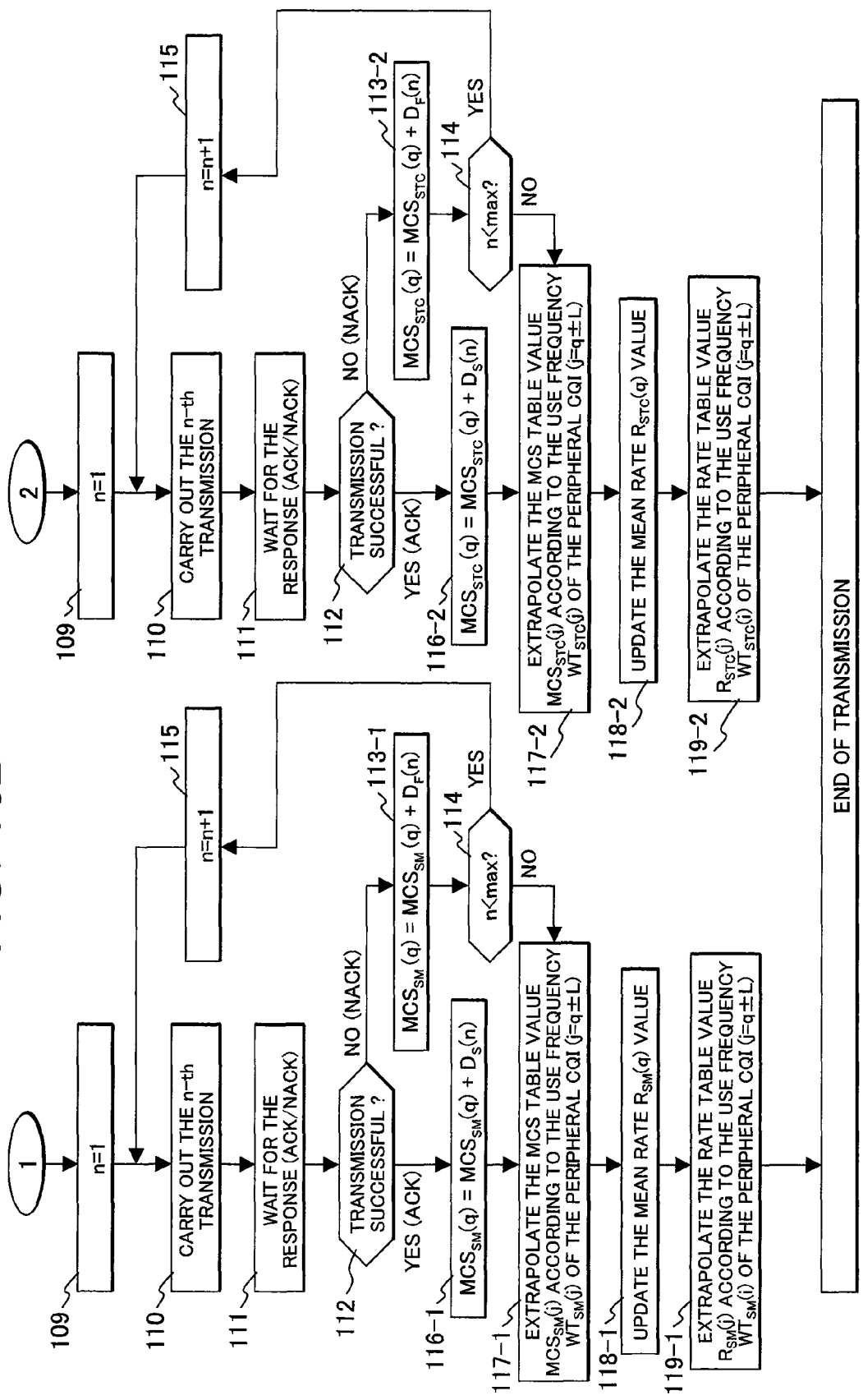
FIG. 16B is a flowchart of the processings of the transmitter unit in the first embodiment.

After the processing in step 108, the value of the counter n that counts the number of transmission (retransmission) times is initialized to 1 in step 109 in FIG. 16B. Then, in step 110, the radio frequency circuit 16 shown in FIG. 2 sends out signals in the MIMO mode and according to the encoding and modulating systems decided above. In step 111, the processing section waits for a control signal (ACK/NACK denoting the success/failure of the receiving) from the receiver unit 4.

The processing section, upon receiving a control signal (NACK (failure)) from the receiver unit 4, changes the MCS value having been used so far just by the receiving failure time updating (change) amount $D_F(n)$ in accordance with the current transmission count in steps 113-1 and 113-2. If the transmission count does not reach the preset maximum count (max) yet, 1 is added to the value of the counter n and control returns to step 110 to carry out the n-th retransmission. Upon receiving an ACK (success), the processing unit changes the MCS value having been used so far just by the receiving success time updating amount $D_S(n)$ in accordance with the transmission count n in steps 116-1 and 116-2.

A CPU makes this MCS value change with the use of a program loaded into itself. The CPU is a processing unit that functions as the AMC (Adaptive Modulation and Coding) table controlling section 15. In this first embodiment, the value to be taken as each of the receiving failure time updating amount $D_F(n)$ and the receiving success time updating amount $D_S(n)$ is decided by the transmission count n as shown in FIG. 19. In FIG. 19, the updating amounts $D_F(n)$ and $D_S(n)$ are used within a range in which the maximum transmission count is four (max=4). Those updating amount tables are also stored in a memory (not shown). And the CPU that functions as the AMC (Adaptive Modulation and Coding) table controlling section 15 reads the updating amount corresponding to the result (success/failure) of the receiving and the transmission count.

In this first embodiment, the AMC (Adaptive Modulation and Coding) table controlling section 15 updates the MCS value held in the AMC table in steps 113-1, 113-2, 116-1, and 116-2. This is because the MCS differs even with respect to the same CQI if the statistical channel characteristics are different. For example, if the CQI is very accurate and the optimal communication rate, that is, the MCS value is decoded uniquely due to CQI notification, the receiving can be made almost successfully at the first transmission. If the channel quality variation is large and the CQI error is also large, however, the communication can be made only at a lower communication rate than that judged from the notified CQI value, although the communication can be made at a higher communication rate in some cases. In this case, if an MCS value enables the object data to be always received successfully at the first transmission, the communication comes to be made only at a lower communication rate than the mean communication rate.

If the subject CQI value includes an error or if the communication rate cannot be decided correctly only with the CQI value, it is recommended that at first the transmitting is made with the MCS that takes a slightly higher communication rate. If the transmission is made successfully at this time, the selected higher communication rate can be used as is. If the transmission fails, retransmission should be made just to complete the communication successfully. In other words, if it is judged that the CQI value is accurate and the communication can be made correctly only with the CQI value, the first transmission success probability should be set higher. If it is expected that the CQI value is not so accurate and the communication rate cannot be judged correctly only with the CQI, a higher communication rate should be selected within a range in which the receiving could be successful even when it is expected that the first transmission might result in a high possibility of failure.

However, it should be avoided that an excessively high communication rate is set. Otherwise, chain retransmission often occurs and even the retransmission might come to fail. Upon selecting an MCS value, therefore, a higher communication rate that can prevent such chain retransmission occurrence should preferably be selected. In other words, upon changing the MCS value properly in the AMC table, consideration should be taken of how the transmission (retransmission) count will affect the change of the success/failure probability. In this first embodiment, from such a point of view, the MCS value updating amounts $D_F(n)$ and $D_S(n)$ are set differently according to the transmission count at both success and failure times.

The updating amount shown in FIG. 19 should preferably be set as any shown in FIG. 20A, FIG. 20B, and FIG. 20C. In the updating amount table shown in FIG. 20A, each updating amount is set as a positive value so as to enable the MCS value to be set slightly higher at the first transmission time regardless of success and failure of the transmission. And a negative value is set for each updating value so as to lower the MCS value if the second transmission results in failure. In other cases, the updating amount is set at 0 so as to prevent MCS value changes. As a result, in FIG. 20A, if the ratio between the frequency of the first receiving failure and the frequency of the second receiving failure becomes about 100:1, the expected MCS value increment amount and the expected MCS decrement value become almost equal, thereby the MCS values are converged. This means in the case shown in FIG. 20A that the number of failures in retransmissions is suppressed so as to prevent chain retransmission occurrence while the first transmission failure is overlooked.

Almost the same effects can also be expected in FIG. 20B. In other words, the MCS value just increases slightly at the first transmission. In this case, the MCS value is controlled so that the probability ratio between the second transmission success and the second transmission failure becomes about 100:1. In the example shown in FIG. 20C, the MCS value is also controlled so that the probability ratio between the success in the second transmission and the success in the third transmission becomes about 100:1. In FIG. 20C, if the receiving fails even at the maximum transmission count, the MCS value is lowered. Thus the MCS value updating amount table should preferably be set so that the MCS value can be set within a range in which chain retransmission occurrence is prevented by taking consideration of the valence between the success and failure frequencies while transmission and retransmission are repeated as described above.

In this first embodiment, if the receiving is successful or if the transmission count reaches the maximum count, the subject mean rate value $R_{SM}(q)$ or $R_{STC}(q)$ in the measured rate table shown in FIG. 4 is updated in steps 118-1 and 118-2 in FIG. 16B. As described above, the measured rate table holds the mean rate (throughput) of the actual communications finished successfully so far.

Figures 21, 22:
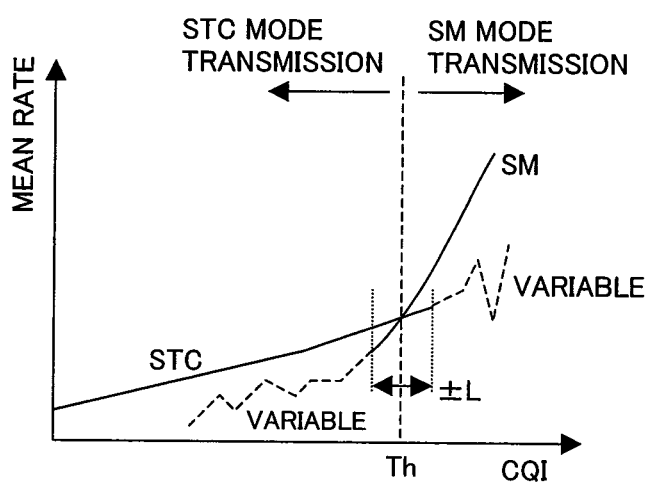
FIG. 21 is a CQI reference frequency information table in a configuration employed in the first embodiment.
FIG. 22 is a graph for describing the result of updating processings for a measured rate table with use of estimated values in the first embodiment.

Furthermore, in the processings described above, the frequency information to be referred to at the time of table updating to be described later, that is, the use frequency information WT about the combination of a CQI and a MIMO mode as shown in FIG. 21 is updated in steps 102, 106-1, and 106-2 in FIG. 16A. The processings in steps 102, 106-1, and 106-2 are executed to measure the use frequency with use of an oblivion coefficient (1−k) and computed so as to set a large value for the use frequency information WT when the use frequency was high in the near past.

After this, the transmitter unit 1 also updates the AMC table and the mean rate in the measured rate table in steps 117-1, 117-2, 119-1, and 119-2 in FIG. 16B in this first embodiment. To make those updating processings, the transmitter unit 1 refers to the use frequency information WT described above. Why those tables are updated in steps 117-1, 117-2, 119-1, and 119-2 is to be ready for the use that might be required in the future due to a change of the statistical channel characteristics while those table values are not used currently. The MCS value in the currently set MIMO mode is updated in steps 113-1, 113-2, 116-1, and 116-2 as described above and the mean rate is updated in steps 118-1 and 118-2, thereby the tables come to hold proper values respectively.

However, as a result of the comparison in step 103 in FIG. 16A, it is decided that the MCS value in the subject MIMO mode and the mean rate value are not used, thereby they are not updated. And if those values are not to be used in the future, as well, there is no need to hold correct values for them. In spite of this, there is still expected a case, in which the optimal value and the mean rate value in the AMC table are to be changed due to a change of the statistical channel characteristics. This is why it is required to keep both the MCS value and the mean rate value updated currently with respect to the subject MIMO mode that has not been used. Consequently, in this embodiment, if there is a CQI having a low use frequency value around the current CQI, the MCS value and the mean rate value corresponding to the CQI are updated with use of an estimated value in steps 117-1, 117-2, 119-1, and 119-2. This estimation can be made by a known method, such as extrapolation by linear approximation, extrapolation by higher order approximation, etc. Consequently, for example, a regression curve (or a linear regression line) is figured out for a mean value and an MCS value respectively by using the measured rate table (FIG. 4) and the AMC table (FIG. 5) with respect to a CQI value having the use frequency shown in FIG. 21 over a certain value in the neighborhood (q±L) of the current CQI. And this regression curve (or the linear regression line) can be used to estimate the values of the measured rate table (FIG. 4) and the AMC table (FIG. 5) with respect to the CQI having the use frequency information shown in FIG. 21 over a certain value in the neighborhood (q±L) of the current CQI. Upon figuring out the regression curve (or the linear regression line), consideration should be taken of a weight in accordance with the use frequency information WT and each estimated value should be updated in accordance with a reverse weight of the use frequency information WT.

Figure 23A:
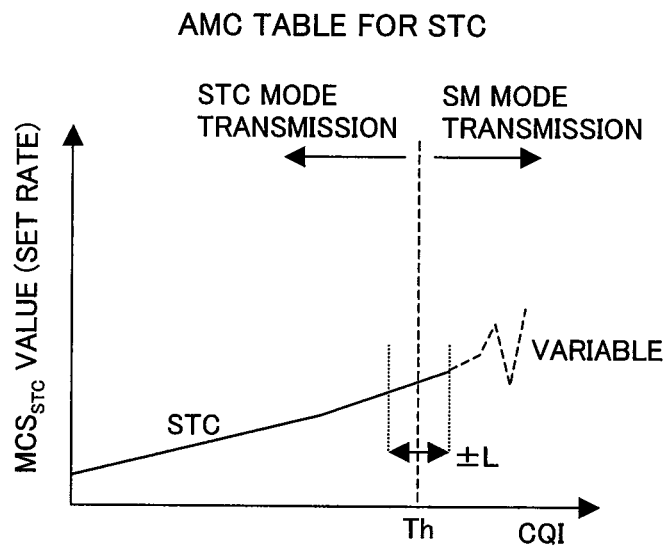
FIGS. 23A and 23B are graphs for describing the result of updating processings for an AMC table with use of estimated values in the first embodiment.
Figure 23B:
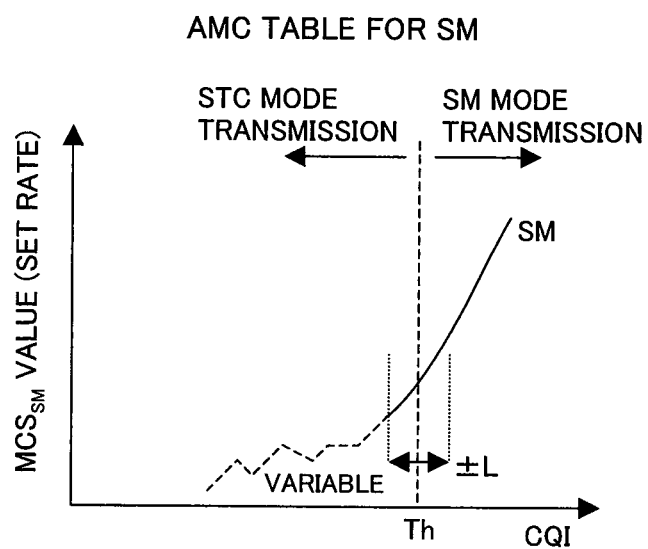

As a result, a value obtained by an estimated value comes to be held in the neighbor (±L) of the MIMO mode switchover point Th with respect to the mean rate in the measured rate table as shown in FIG. 22 and with respect to the AMC table as shown in FIGS. 23A and 23B. The CQI value, when it is separated more than ±L from the switchover point Th, is not updated by an estimated value. And the value becomes variable. Even in such a case, it is expected that the statistical channel characteristics are varied step by step, so that the CQI value in the neighborhood of the switchover point Th comes to be used first. Consequently, the value comes to be updated correctly, thereby the switchover point Th moves and its neighborhood is estimated. Updating by such an estimated value could thus be required only around the switchover point Th.

Figure 24A:
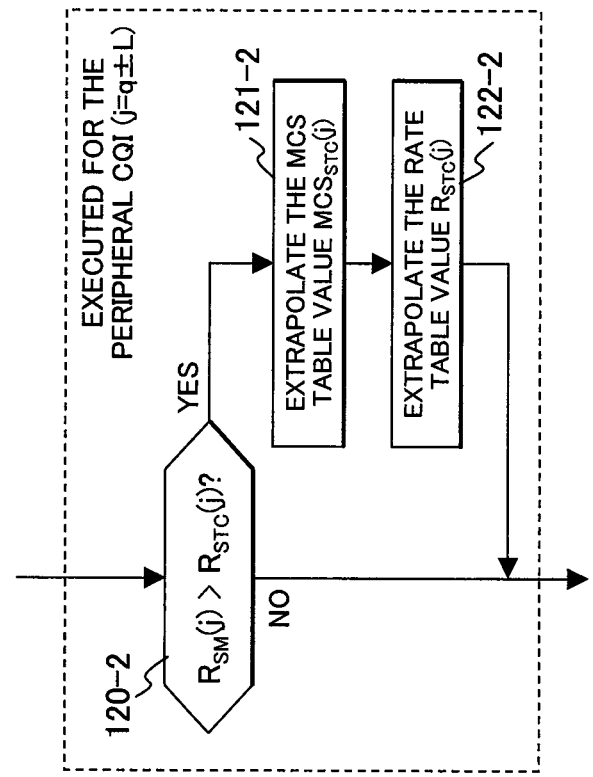
FIGS. 24A and 24B are flowcharts of the processings for updating the measured rate table and the MCS table of a peripheral CQI in the first embodiment.
Figure 24B:
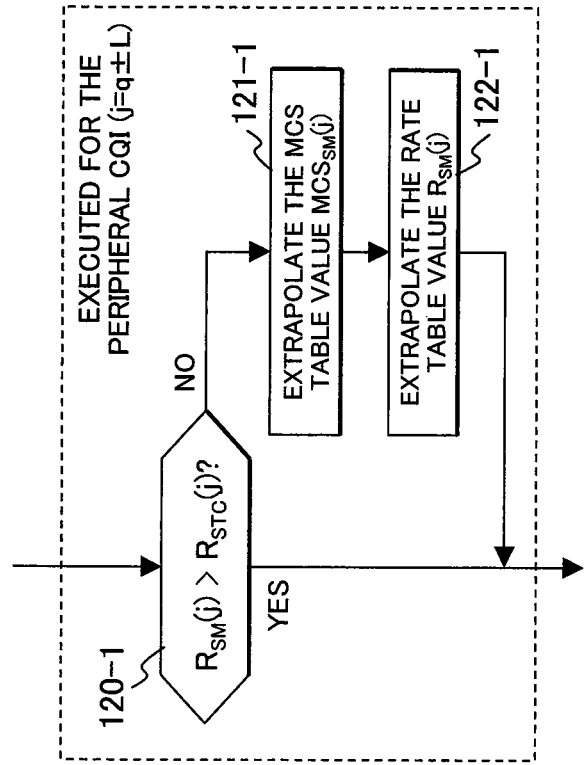

In steps 117-1, 117-2, 119-1, and 119-2, it is decided whether to make the above updatings with use of estimated values according to the use frequency information WT respectively. As shown in the examples in FIGS. 24A and 24B, it is also possible to decide whether or not each object neighbor CQI value (q±L) is that of an unused table with reference to the measured rate table 13, which is used to select the current MIMO mode (steps 120-1 and 120-2), then to update the MCS value, the mean rate value, etc. in the AMC table and in the measured rate table with use of estimated values obtained by extrapolation respectively (steps 121-1, 121-2, 122-1, and 122-2). In this case, no updating step is required for the use frequency table shown in FIG. 21 and for the use frequency table updated in steps 101, 106-1, and 106-2.

As described above, there are two MIMO modes (SM and STC) used in the embodiment of the present invention. However, those modes may be replaced with other MIMO modes; for example, they may be a specific mode which maps signals in accordance with a unique vector of the subject channel matrix H, the STBC (Space-Time Block Code) transmission mode that realizes stable communications with use of four or more antennas. For example, in the above document of 3GPP TS 36.211 v8.30 "Evolved Universal Terrestrial Radio Access (E-UTRA); Physical Channels and Modulation", "6.3.3 Layer mapping", "spatial multiplexing" and "transmit diversity" are described as modes corresponding to the SM and STC modes. In each of those modes is defined plural MIMO communication systems realized by plural combinations of the number of layers and the number of code words. As a result, there comes to be provided five MIMO communication systems for the "spatial multiplexing" mode and two MIMO communication systems for the "transmit diversity" mode. The present invention is also effective to decide a proper one from those seven MIMO communication systems to make communications. In this case, it is just required to reform the tables that store necessary values of SM and STC modes as shown in FIGS. 4, 5, 21, etc. so as to have values corresponding to each of those seven modes and to compare seven mean rates to obtain the maximum mean rate of the seven mode values and execute the processings in and after step 104 (104-1 and 104-2) instead of comparing two mean rates in step 103 in FIG. 16A.

Furthermore, the present invention is also effective for a system having MIMO communication modes (systems) so as to enable spatial multiplexing transmission to be executed simultaneously for plural receiver units. For example, if a transmitter unit uses two receiving antennas, the radio communication unit comes to select three modes (first to third); the first mode is used to transmit one signal to one receiver unit in the STC mode, the second mode is used to transmit two signals to one receiver unit in the SM mode; and the third mode is used to transmit two signals to two receiver units by means of space division multiplexing. Also in this case, it is just required to form the measured rate table (FIG. 4), the AMC table (FIG. 5), and the use frequency table (FIG. 21) for each of those three MIMO modes and select a most proper mode so as to assure the maximum total mean rate (a total of plural receiver radio communication apparatuses) in step 103 in FIG. 16A. If it is required to take consideration of the minimum rate to be assured for each receiver unit, it is just required to select a MIMO mode that assures the maximum total mean rate within the restriction in step 103 in FIG. 16A.

As described above, according to the present invention, therefore, it is possible to provide a method for selecting a proper one of plural MIMO communication systems, a proper one of plural encoding systems, and a proper one of plural modulating systems respectively so as to assure a high communication throughput in each radio communication apparatus that can cope with plural MIMO communication systems in an environment in which the statistical characteristics of the subject channel are varied frequently. In addition, it is also possible to provide a radio communication apparatus that can use the method.

What is claimed is:

1. A transmission system switching method for a MIMO communication apparatus that makes communications, the transmission system switching method comprising:
   selecting a proper one of a plurality of MIMO (Multiple Input Multiple Output) communication systems, a proper one of a plurality of encoding systems, and a proper one of a plurality of modulating systems; and
   changing a current reference used to select the current combination of the proper one of the MIMO communication systems, the proper one of the encoding systems, and the proper one of the modulating systems to another reference used to select another combination of the MIMO communication, encoding and modulating systems that have not been used according to the current reference based on a value estimated from the success or failure of communications of the current combination of the MIMO communication, encoding and modulating systems.

2. The transmission system switching method for the MIMO communication apparatus according to claim 1, wherein the current reference respectively is changed according to a data transmission count and a result of the subject communication with respect to the same data.

3. The transmission system switching method for the MIMO communication apparatus according to claim 2, wherein the a mean value and an MCS (Modulation and Coding Scheme) value of each of the plurality of MIMO communication systems, corresponding to a CQI (Channel Quality Information) value are used as the reference for selecting the MIMO communication, encoding, and modulating system to be used as the another combination.

4. The transmission system switching method for the MIMO communication apparatus according to claim 3, wherein the MCS value corresponding to the combination of the MIMO communication, encoding, and modulating systems that are used is changed respectively in accordance with the transmission count and the communication result (success/failure) to another MCS value corresponding to another combination of the MIMO communication, encoding, and modulating systems that are not used respectively according to the updated MCS value.

5. The transmission system switching method for the MIMO communication apparatus according to claim 4, wherein the mean rate corresponding to the currently selected MIMO communication system is updated when the data is received successfully or when the transmission count reaches a preset value, then a mean rate according to the updated mean rate is estimated and the mean rate is changed to the estimated one for one of the MIMO communication systems that is not currently used.

6. A radio communication apparatus that makes communications by selecting proper one of a plurality of MIMO communication systems, proper one of a plurality of encoding systems, and proper one of a plurality of modulating systems respectively, the apparatus comprising:

a radio frequency circuit;

a demodulating/decoding section that demodulates/decodes a signal received by the radio frequency circuit;

an encoding/modulating section that encodes/modulates transmission data; and a processing section that selects the proper MIMO communication system, the proper encoding system, and the proper one modulating system according to a CQI value extracted from the received signal by the demodulating/decoding section, wherein the processing section stores a mean rate of each of the plurality of MIMO communication systems and an MCS value that denotes the encoding and modulating systems corresponding to each of the plurality of MIMO communication systems with respect to the CQI value respectively;

wherein the processing section controls so that encoding and modulating systems used to transmit the data are selected according to the MIMO communication system decided by the CQI value; and wherein the processing section changes the MCS value of the currently used MIMO communication system according to the transmission count and the result of the communication and updates the MCS value of another MIMO communication system that is not used currently with use of an estimated value.

7. The radio communication apparatus according to claim 6, wherein the processing section includes:

a measured value table that stores a mean rate of each of the plurality of MIMO communication systems, corresponding to the CQI value;

a communication system deciding section that decides one of the MIMO communication systems used to transmit the data with reference to the measured rate table; and an AMC table controlling section that refers to the AMC table that stores the MCS value denoting each of the encoding and modulating systems corresponding to each of the MIMO communication systems in accordance with the CQI value and selects proper encoding and modulating systems used to transmit the data in accordance with the MIMO communication system decided by the communication system deciding section.

8. The radio communication apparatus according to claim 7, wherein the processing section further includes an MCS value updating amount table that stores an updating amount used to change the references for changing the encoding and modulating systems according to a signal that denotes the result (success/failure) of the data transmission and the transmission count extracted from the received signal by the demodulating/decoding section.

9. The radio communication apparatus according to claim 8, wherein the processing section changes the MCS value of the currently used MIMO communication system according to a value in the MCS value updating amount table and updates the MCS value of another MIMO communication system that is not used currently with use of a value estimated from the changed MCS value.

10. The radio communication apparatus according to claim 9, wherein the processing section updates the mean rate in the measured rate table corresponding to the MIMO communication system that is used currently when the data is received successfully or when the transmission count reaches a preset value, then estimates and updates the mean rate corresponding to a MIMO communication system that is not used currently according to the updated mean rate.

11. The radio communication apparatus according to claim 10, wherein the processing section updates the MCS value and the mean rate corresponding to a CQI value of low use frequency with use of an estimated value when there is a CQI value of such low use frequency around the CQI value that is used currently.

* * * * *